W. V. WALLBURG.
CONFECTIONERY MAKING MACHINE.
APPLICATION FILED OCT. 17, 1919.
1,383,681.
Patented July 5, 1921.
2 SHEETS—SHEET 1.
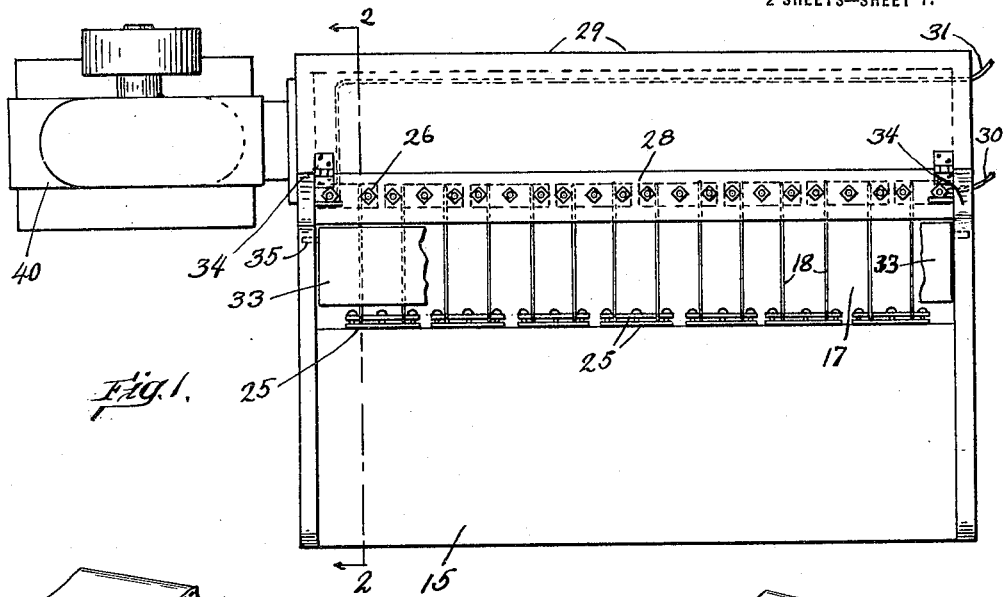
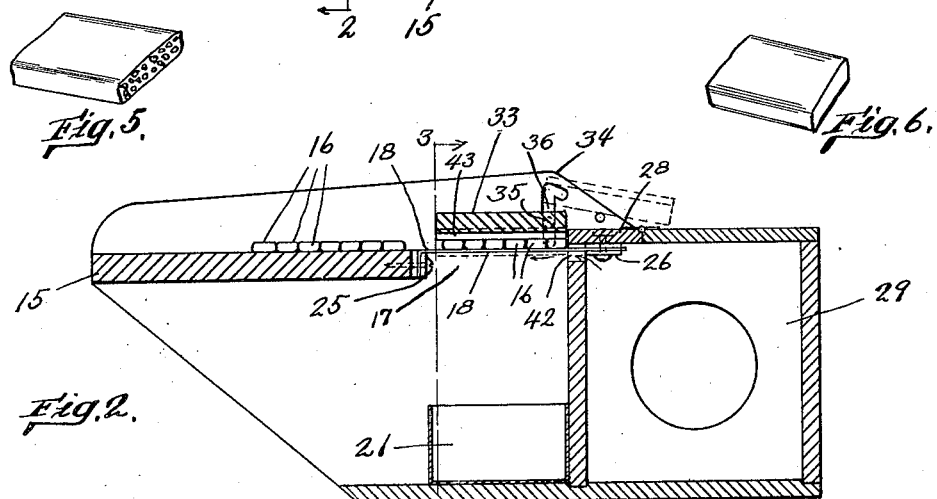
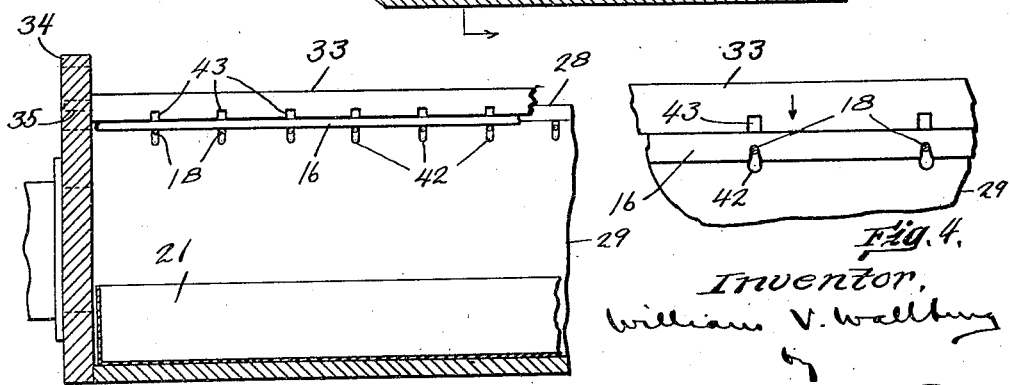
Inventor,
William V. Wallburg

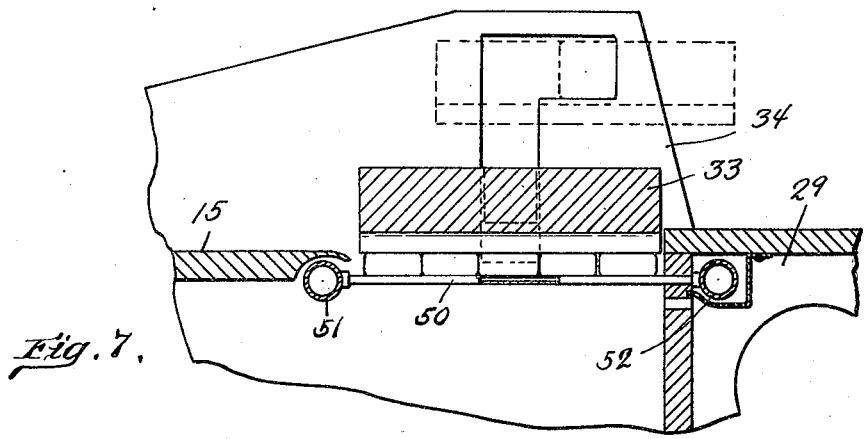
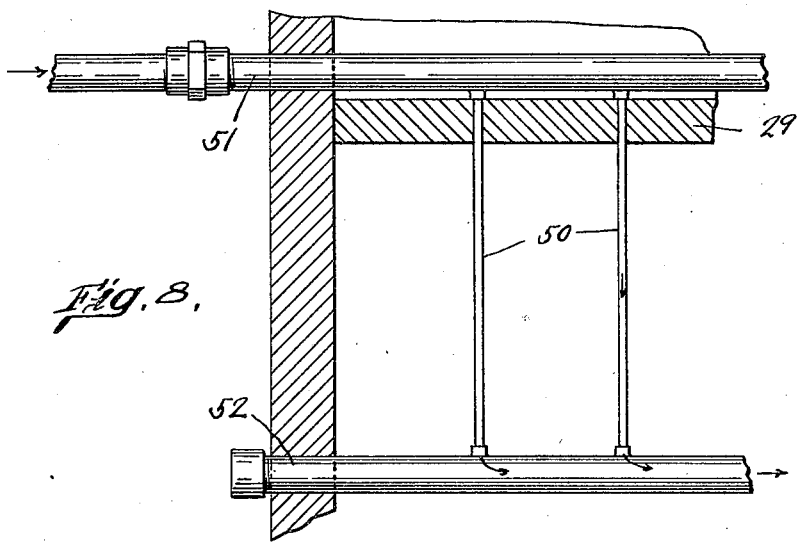
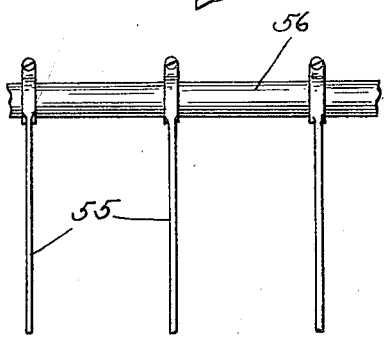
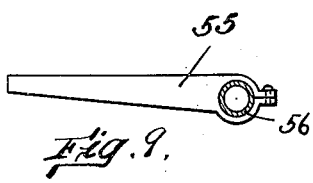

UNITED STATES PATENT OFFICE.

WILLIAM V. WALLBURG, OF MELROSE, MASSACHUSETTS.

CONFECTIONERY-MAKING MACHINE.

1,383,681.     Specification of Letters Patent.     Patented July 5, 1921.

Application filed October 17, 1919. Serial No. 331,405.

*To all whom it may concern:*

Be it known that I, WILLIAM V. WALL-BURG, a citizen of the United States, and resident of Melrose, county of Middlesex, and State of Massachusetts, have invented an Improvement in Confectionery-Making Machines, of which the following is a specification.

This invention relates to candy making machines, and more particularly to machines for separating strands of cellular candy into predetermined lengths and for simultaneously sealing up the cells at the point of separation.

In another application, Serial No. 331,404, filed Oct. 17, 1919, a confection and method of making the same is described wherein a homogeneous mass of candy having an internal cellular portion and sealed end portion may or may not be externally coated over all.

In the manufacture of this confection the cellular mass comprises a plurality of longitudinal tubes or cells the walls of which are united to form a homogeneous structure and which is formed into a strand by pulling, drawing, or otherwise manipulating it, and then the strand is divided into pieces of suitable length to be coated.

The cells at the divisional surfaces are closed by melting the material at such surfaces, so that externally sealed pieces are produced having internal cellular portions. The object of the present invention is an improved machine for dividing strands of cellular candy into pieces of appropriate length and for simultaneously melting the material at the divisional surfaces of the pieces to close the ends of the cells, whereby the process described and claimed in the application above referred to may be expedited and economy obtained.

My invention contemplates the use of a plurality of parallel arranged wires or equivalent means, together with means for heating them to a degree sufficient to melt the candy and close any cell with which the wires or equivalent means may come in contact. An auxiliary means for pressing the strands of candy into engagement with the wires or equivalent means may be employed if desired.

In the accompanying drawing,

Figure 1 is a plan view of an apparatus embodying my invention,

Fig. 2 is a transverse section of Fig. 1 taken on the line 2—2,

Fig. 3 is a vertical section along line 3—3 of Fig. 2,

Fig. 4 is a detail of the machine illustrating the cutting action,

Fig. 5 is a perspective view of an end portion of the strand, broken off to illustrate the cellular formation of the interior of the strand, Fig. 6 is a similar view of the end portion of the strand, cut off by the apparatus of the invention, and showing the external surface devoid of cells or openings, Figs. 7 and 8, respectively, are sectional transverse and plan view details of a modified form of dividing element which may be employed, and Figs. 9 and 10, respectively, are sectional plan and side view details of another modified form of cutting or dividing element which may be employed.

Referring to the drawings, the apparatus embodies a shelf 15 adapted to receive upon it the strands 16 of the cellular confection of suitable length to be easily manipulated, several strands being arranged in parallel relation lengthwise of the shelf and in edgewise contact, if desired. Near the edge of the shelf there is a large opening 17 which may be made as long as the shelf and at the top of said opening several wires are arranged from front to rear thereof, thus crossing the opening transversely.

These wires are preferably arranged in a row and are spaced apart equal to the distance of the desired length of a confection, so that if a strand 16 is to be laid upon the several wires 18 lengthwise of the opening 17, they will be divided into confections of the desired lengths.

The wires 18 are preferably arranged at the top of the opening and flush with the top of the shelf, so that the strands of confection resting on the shelf may be moved onto the wires by an easy sliding movement in a horizontal plane.

Usually a plurality of strands 16 are placed onto the wires 18 at the same time, as shown in Fig. 2, and arranged in parallel relation and in edgewise contact, but this number may be varied as desired.

It is designed and intended that the strands shall be divided into small pieces by the wires, and to this end, as shown in the preferred embodiment of my invention, see Figs. 1 to 6, the wires are heated to a suitable cutting temperature and the strands of candy reposing thereon and being otherwise unsupported, are melted along the line of engagement with the wires and are thus divided into small pieces or sections and the pieces permitted to pass between the wires and fall into a suitable receptacle, as 21, which may be provided for this purpose.

In the preferred embodiment of my invention, the wires 18 are made as electric conductors and may be supported as shown at their ends by plates or clamps 25 and 26, the end clamp 25 connecting them with the edge of the shelf at the opening 17, and the end clamp 26 connecting them with the wall 28 of a box-like structure 29 which is provided in rear of the opening 17, assuming the shelf 15 to be at the front.

These wires are connected electrically with the circuit wires 30 and 31, in any usual or suitable manner so that when the current is turned on the wires become heated to a temperature sufficient to melt the candy which is placed upon them. By placing the strand or strands of candy on the heated wires they will be melted on the line of engagement with the wires and will fall by gravity into the receptacle 21. The speed of operation of the apparatus may be accelerated by providing a pressure device 33, which may be a heavy plate or board adapted to be brought into position to bear on the strand, so that, by the added weight thereto, they may be pushed downward through the spaces between the heated wires. Said weighted pressure device 33 may be connected at its sides with suitable side supports 34 by pins 35 entering the grooves 36 in said support, or other means may be employed for connecting it therewith. Said weight is simple in construction and easy to operate. It may be quickly lifted from the wires and turned back to uncover them, as represented by dotted lines in Fig. 2, and may be returned and brought into position to impose pressure on all of the strands alike, readily adjusting itself for engagement with all of the strands.

The weight 33 or other pressure applying device may have its under surface formed with grooves 43 arranged transversely thereon directly above the wires, so that as it descends by gravity the wires may enter these grooves and the portions of the weight between the grooves will enter the spaces between the wires and press the candy strands downward between the wires.

There is a tendency for the pieces to stick together which I find can be overcome by artificially solidifying the layer of melted material at the ends of the confection as by the application thereto of a current of relatively cool air, and to this end the box-like structure 29 is provided as the support for the end clamps of the wires.

Said box-like structure is designed and intended for use as a compartment or duct for air and it extends along the rear of the apparatus throughout the entire length of the row or set of wires or other dividing means. A blower 40 is connected with the compartment for supplying air thereto. Said compartment has numerous orifices or discharge openings 42 at the upper edge of the side walls adjacent to the end clamp of the wires, so disposed and arranged that jets of air may issue from said box directly beneath the wires to cool or chill and solidify the melted layer of confection at the divided ends so that the pieces are thus prevented from sticking together.

The wires may extend through the upper end portion of these delivery orifices 42, and in this case the air will be forcibly delivered directly into engagement therewith.

The candy in mass formation is cellular, and is drawn, pulled, or otherwise manipulated to form strands of suitable dimensions in cross section, which, as formed, comprise a plurality of longitudinal cells or tubes extended the length of the strand the walls of which are united together to form a homogeneous mass. A broken or end-portion of a strand is illustrated in Fig. 5.

As the pieces are ordinarily formed, by breaking, from the strand, the process of coating the pieces with chocolate or other substance cannot be relied upon to seal the ends of all of the cells or to maintain them sealed for a sufficient period of time and as a result the pieces absorb moisture from the air and rapidly granulate or disintegrate and become unsalable. For this reason it is designed and intended to close or seal the cells at the divisional surfaces preferably when dividing the strand into small pieces, hence the strands are slid along the shelf over upon the heated wires and the pressure device brought into engaging position. Due to the heat, or to the combined heat and pressure the heated wires melt into the material surfaces, and the melted material at the points of division sealing over and closing the ends of the cells thereat. This operation continues until the strands have moved down through the spaces between the heated wires, whereupon the small pieces fall into the receptacle provided for them. It will be also noted that during all this time the cold air is being delivered to impinge against the cut portion of the strand, so that it will cool the melted layers at such places and thus harden and dry the pieces, thereby to effectually seal the ends of the cells and prevent the pieces sticking together.

In lieu of making the dividing wires as electric conductors, they may be made as small tubular steam pipes 50, see Figs. 7 and 8, which are connected by suitable fittings with the steam pipes 51 and 52. These small pipes are designed to act the same as the heated wires to divide the strands into small pieces, or in lieu of making the dividing wires as steam pipes they may be made as solid metallic bars or blades 55, see Figs. 9 and 10, attached directly to the steam pipe 56, so that heat from said pipe is conducted to said blade or bar and the blade or bar thereby heated to a degree sufficient to melt the strands. Other modifications, which will readily suggest themselves to those skilled in the art, are obviously within the scope of my invention.

I claim:

1. The combination of a plurality of dividing means arranged side by side and spaced apart, upon which strands of candy are adapted to be placed, means to heat said dividing means to a temperature sufficient to melt the candy strands placed thereon, and means to press the candy strands against the dividing means in a downward direction to accelerate the dividing movement.

2. The combination of a plurality of wires arranged side by side and spaced apart upon which strands of candy are adapted to be placed, means to heat said wires to a temperature sufficient to melt the candy strands placed thereon, and means to press the candy strands against the dividing means in a downward direction to accelerate the melting effect.

3. The combination of a plurality of electric conductors arranged side by side and spaced apart, upon which strands of candy are adapted to repose, means to supply current to heat said conductors to a temperature sufficiently high to melt the candy strands, and means to press the candy strands reposing upon the conductors, in a downward direction to accelerate the melting effect.

4. The combination of a plurality of dividing means arranged side by side and spaced apart, upon which strands of candy are adapted to repose, means to heat said dividing means to a suitable cutting temperature, whereby it will melt the candy strands, and weighted means to press the candy strands reposing on the dividing means in a downward direction.

5. The combination of a plurality of dividing means arranged side by side and spaced apart, upon which strands of candy are adapted to repose, means to heat said dividing means to a temperature, to suitably melt the candy strands, and a movable plate arranged for vertical movement to press the candy strands reposing upon the dividing means in a downward direction.

6. The combination of dividing means arranged side by side and spaced apart, upon which strands of candy are adapted to repose, means to heat said dividing means to a temperature, to suitably melt the strands, and a removable heavy plate arranged above the dividing means, adapted to engage the candy strands thereon and act to press said strands in a downward direction.

7. The combination of a shelf for strands of candy, a plurality of dividing means arranged in a horizontal plane flush with the top of said shelf, a pressure device arranged to press a candy strand on the dividing means in a downward direction and means to heat said dividing means.

8. The combination of a plurality of dividing means arranged side by side and spaced apart, adapted to receive upon them candy in strand formation, a pressure device arranged to engage the strands thereon and move them downwardly with respect to the dividing means, means for heating the dividing means to a temperature sufficient to melt the strands, and means artificially to cool the melted surfaces.

9. The combination of a plurality of dividing means arranged side by side and spaced apart, adapted to receive upon them candy in strand formation, a pressure device arranged to engage the strands thereon and move them downwardly with respect to the dividing means, means for heating the dividing means to a temperature sufficient to melt the strands, an air compartment arranged in rear of the dividing means and connected with an air supply having delivery orifices adjacent the dividing means for delivering air to the melted surfaces.

10. The combination of a plurality of dividing means arranged side by side and spaced apart, adapted to receive upon them candy in strand formation, a pressure device arranged to engage the strands thereon and move them downwardly with respect to the dividing means, means for heating the dividing means to a temperature sufficient to melt the strands, an air compartment arranged in rear of the dividing means and coextensive therewith connected with an air supply having a plurality of delivery orifices from which the dividing means lead, said orifices admitting of delivery of air along the melted surfaces of the strand and the resulting cooling of said surfaces preventing the pieces from sticking together.

11. The combination of a plurality of dividing means arranged side by side and spaced apart, adapted to receive upon them candy in strand formation, a pressure device arranged to engage the strands thereon and move them downwardly with respect to the dividing means, means for heating the dividing means to a temperature sufficient to melt the strands, an air compartment in rear of the dividing means connected with an air supply and having a plurality of delivery orifices from which the dividing wires lead, the air issuing from said orifices engaging the melted surfaces and cooling same to prevent the pieces from sticking together.

12. A candy cutting machine having an opening, a plurality of dividing means arranged side by side, and spaced apart above the opening upon which a strand of candy is adapted to be placed in angular relation with respect thereto, and means for heating said dividing means to a temperature sufficient to melt the candy strand to divide it, the pieces passing through the spaces down into the opening.

13. A candy cutting machine having an opening, a plurality of dividers arranged in parallel relation and spaced apart above the opening upon which strands of candy are adapted to be placed in angular relation with respect thereto, means for heating said dividers to a temperature sufficient to melt the candy strand thus dividing them into small pieces which pieces pass through the spaces down into the opening.

14. A candy cutting machine having an opening, a plurality of electric conductors arranged in parallel relation and spaced apart above the opening upon which a strand of candy is adapted to be placed in angular relation with respect thereto, said conductors adapted to be heated by an electric current to melt the candy strands and thus divide them into small pieces which pass through the spaces down into the opening.

15. A candy cutting machine having a shelf, and an opening at the rear thereof, a plurality of dividing means arranged in rear of said shelf and above the opening, said means being arranged in parallel relation and spaced apart, angularly relation to the shelf, means for heating said dividing means to a temperature sufficient to melt the candy strand reposing thereon thus dividing it into small pieces, which pieces pass through the spaces into the opening.

16. A candy cutting machine having an opening, a plurality of dividing means arranged side by side, and spaced apart above the opening upon which a strand of candy is adapted to be placed in angular relation with respect thereto, and means for heating said dividing means to a temperature sufficient to melt the candy strand to divide it, the pieces passing through the spaces down into the opening, and cooling means for delivering air to the divisional surfaces of the candy strand.

17. A candy cutting machine having an opening, a plurality of dividing means arranged side by side, and spaced apart above the opening upon which a strand of candy is adapted to be placed in angular relation with respect thereto, and means for heating said dividing means to a temperature sufficient to melt the candy strand to divide it, the pieces passing through the spaces down into the opening and cooling means having delivery orifices adjacent the dividing means for delivering air to the melted divisional surfaces of the strand.

18. The method of dividing a strand of candy which consists in locally heating the strand at the point of division and simultaneously cooling the divided portions thereof.

19. The method of dividing a strand of candy which consists in forcing a heated dividing device into the body of the material thereby to melt and separate it and simultaneously artificially cooling the melted and divided material.

In testimony whereof, I have signed my name to this specification, in the presence of two subscribing witnesses.

WILLIAM V. WALLBURG.

Witnesses:
GEORGE F. WALLBURG,
SAMUEL SIDLOFSKY.